United States Patent
Eager et al.

(10) Patent No.: US 11,585,251 B2
(45) Date of Patent: Feb. 21, 2023

(54) METHOD OF CONTROLLING OPERATION OF AN EXHAUST GAS TREATMENT APPARATUS

(71) Applicant: Perkins Engines Company Limited, Peterborough (GB)

(72) Inventors: Antony J. Eager, Peterborough (GB); Thomas E. Lloyd, Peterborough (GB); Peter Moorhouse, Higham Ferrers (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 17/294,924

(22) PCT Filed: Nov. 18, 2019

(86) PCT No.: PCT/EP2019/025399
§ 371 (c)(1),
(2) Date: May 18, 2021

(87) PCT Pub. No.: WO2020/104055
PCT Pub. Date: May 28, 2020

(65) Prior Publication Data
US 2022/0010709 A1 Jan. 13, 2022

(30) Foreign Application Priority Data
Nov. 19, 2018 (GB) .................... 1818837

(51) Int. Cl.
*F01N 3/20* (2006.01)
*B01D 53/94* (2006.01)
(Continued)

(52) U.S. Cl.
CPC ......... *F01N 3/2006* (2013.01); *B01D 53/944* (2013.01); *B01D 53/9418* (2013.01);
(Continued)

(58) Field of Classification Search
CPC ...... F16K 11/076; F02B 37/183; F02B 37/22; F02B 37/025; F02D 9/16; F02D 35/00;
(Continued)

(56) References Cited

U.S. PATENT DOCUMENTS 6,651,638 B1 11/2003 Oakes
6,910,329 B2 6/2005 Bunting et al.
(Continued)

FOREIGN PATENT DOCUMENTS

EP 1400664 A1 3/2004
EP 2123871 A1 11/2009
(Continued)

OTHER PUBLICATIONS

International Search Report related to Application No. PCT/EP2019/025399; dated Mar. 4, 2020.
(Continued)

*Primary Examiner* — Brandon D Lee (57) ABSTRACT

A method is disclosed for controlling an engine assembly comprising an internal combustion engine and an exhaust gas treatment apparatus. The aftertreatment assembly may require cleaning from time to time, and where this involves active thermal management of the aftertreatment assembly, the method involves performing the following steps: (a) imposing a first limit on engine speed; (b) awaiting an engine safe state; and (c) implementing a cleaning process comprising: (i) injecting fuel into the engine such that the fuel passes through the engine without combusting for the fuel to combust in the diesel oxidation catalyst so as to target an increase in exhaust gas temperature in the diesel oxidation catalyst; and (ii) removing the first limit on engine speed and targeting an engine speed set point, wherein the engine speed set point is at a higher speed than the first limit on engine speed.

15 Claims, 6 Drawing Sheets

(51) Int. Cl.
    *B01D 53/96*       (2006.01)
    *F01N 3/025*       (2006.01)
    *F01N 3/035*       (2006.01)
    *F01N 3/10*         (2006.01)
    *F02D 41/02*       (2006.01)
    *F02D 41/38*       (2006.01)

(52) U.S. Cl.
    CPC ......... *B01D 53/9477* (2013.01); *B01D 53/96* (2013.01); *F01N 3/0253* (2013.01); *F01N 3/035* (2013.01); *F01N 3/106* (2013.01); *F01N 3/2066* (2013.01); *F02D 41/024* (2013.01); *F02D 41/38* (2013.01)

(58) Field of Classification Search
    CPC . F02D 9/06; F01N 3/021; F01N 3/106; F01N 3/2066; F01N 2240/36; F01N 2340/06; F01N 13/08; Y02T 10/12; F02M 26/43
    See application file for complete search history.

(56) References Cited

U.S. PATENT DOCUMENTS

| | | |
|---|---|---|
| 8,919,098 B2 | 12/2014 | Barucchi et al. |
| 9,534,551 B2 | 1/2017 | Miura et al. |
| 2010/0101409 A1* | 4/2010 | Bromberg .............. B01D 46/44 96/397 |
| 2015/0248794 A1 | 9/2015 | Hashimoto et al. |
| 2016/0061086 A1* | 3/2016 | Shiomi ................. F01N 3/0253 60/311 |
| 2017/0009634 A1* | 1/2017 | Shiomi ............... F02D 41/0245 |
| 2019/0040783 A1* | 2/2019 | Li ......................... F01N 3/2066 |

FOREIGN PATENT DOCUMENTS

| | | |
|---|---|---|
| EP | 2469049 A1 | 6/2012 |
| EP | 2886838 A2 | 6/2015 |
| EP | 3124762 A1 | 2/2017 |
| JP | 200637925 A | 2/2006 |
| JP | 200882292 A | 4/2008 |
| JP | 20127570 A | 1/2012 |
| KR | 20150066696 A | 6/2015 |
| WO | 2009143258 A2 | 11/2009 |

OTHER PUBLICATIONS

Great Britain Search Report related to Application No. 1818837.5; dated May 16, 2019.

* cited by examiner

METHOD OF CONTROLLING OPERATION OF AN EXHAUST GAS TREATMENT APPARATUS

CROSS-REFERENCE TO RELATED APPLICATION

This Application is a 35 UK § 371 US National Stage filing of International Application No. PCT/EP2019/025399 filed on Nov. 18, 2019 which claims priority, under the Paris Convention to Great Britain Patent Application No. 1818837.5 filed on Nov. 19, 2018.

TECHNICAL FIELD

The disclosure relates to the field of exhaust gas treatment and, in particular, to controlling operation of an exhaust gas treatment apparatus.

BACKGROUND

An exhaust gas treatment apparatus may comprise a plurality of modules, wherein each module is intended to treat one or more constituents of an exhaust gas. The modules may be arranged in series such that exhaust gas flows through each module in sequence. The exhaust gas treatment apparatus may comprise a first aftertreatment module comprising a diesel oxidation catalyst (DOC) module and a second aftertreatment module downstream of the first aftertreatment module. The second aftertreatment module may comprise a diesel particulate filter (DPF) module and/or a selective catalytic reduction (SCR) module. Where the second aftertreatment module comprises both a DPF module and an SCR module, the SCR module may be downstream of the DPF module.

The diesel oxidation catalyst module may cause constituents of exhaust gas to oxidise. The diesel particulate filter module, where present, may filter soot from exhaust gas in order to prevent that soot from being released to atmosphere. The SCR module, where present, may cause $NO_x$ present in the exhaust gas to undergo a chemical reaction with ammonia to produce Nitrogen and water.

Achieving and maintaining an appropriate temperature in each module may be important for achieving a desired result.

In order to increase the temperature of the exhaust gas before it reaches the second aftertreatment module, it is known to use the diesel oxidation catalyst module to increase the temperature of the exhaust gas passing through it in order to increase the temperature of exhaust gas arriving downstream of the diesel oxidation catalyst. This may be achieved by introducing unburnt fuel upstream of the diesel oxidation catalyst module for oxidation in the diesel oxidation catalyst thereby to increase the temperature of the exhaust gas leaving the diesel oxidation catalyst module.

Accordingly, in addition to injection of fuel for combustion, fuel may be injected into one or more of the cylinders of the engine as a post combustion event with the intention that the fuel passes out of the one or more cylinders without oxidising. This fuel may oxidise in the diesel oxidation catalyst module and thereby increase temperature of exhaust gas therein. Injection of fuel in this way may be termed HC dosing.

Performance of the diesel particulate filter module, where present, may be influenced by an amount of soot trapped in the diesel particulate filter module. Strategies, known as regeneration or cleaning strategies, may be employed to seek to reduce the amount of soot trapped in the diesel particulate filter module. Such strategies may include techniques for ensuring that soot combusts within the diesel particulate filter module as and when appropriate. For example, combustion may be promoted by an increase in temperature within the diesel particulate filter module.

It may be that an amount of soot trapped in the diesel particulate filter module may affect performance of the exhaust gas treatment apparatus and, in turn, engine performance. For example, where a large amount of soot is trapped in the diesel particulate filter module, backpressure caused by the trapped soot may affect engine performance.

Performance of an SCR module, where present, may also be influenced by a build-up of deposits within the SCR module which may be reduced or managed by appropriate thermal management of the exhaust gas passing through the SCR module.

Having an appropriate hierarchy of regeneration/cleaning strategies may improve the performance of the exhaust gas treatment apparatus. Furthermore, it may reduce machine downtime. Moreover, it may increase service intervals.

Cleaning strategies may be divided into two types of cleaning strategy. A first type of strategy may involve taking steps that affect the performance of an engine below a threshold that would be likely to have a significant impact on a user of the engine. A second type of strategy may be more substantial such that they may not be possible to implement whilst allowing a user to continue using the engine for useful work. For the purposes of distinguishing between the first and second types of cleaning strategy, for simplicity, this document refers to strategies of the first type as minor cleaning strategies and strategies of the second type as major cleaning strategies. The terms minor and major in this context are simply labelling terms and should not be understood as implying absolute requirements of the magnitude of the cleaning that is achieved.

SUMMARY OF THE DISCLOSURE

Against this background there is provided a method of controlling an engine assembly comprising an internal combustion engine and an exhaust gas treatment apparatus, the exhaust gas treatment apparatus comprising a first aftertreatment module comprising a diesel oxidation catalyst and a second aftertreatment module downstream of the first aftertreatment module;

the engine assembly configured to provide a numerical indication of an efficiency of the second aftertreatment module;

the method comprising:

comparing the numerical indication of efficiency with a first threshold value and, where the numerical indication of efficiency is such that efficiency falls below the first threshold value, performing the following steps in order:

(a) implementing a first limit on engine speed;
(b) awaiting an engine safe state condition;
(c) implementing a primary cleaning process of the second aftertreatment module, the primary cleaning process comprising, in either order or simultaneously:
  (i) injecting fuel into the engine after an engine combustion event such that the fuel passes through the engine without combusting for the fuel to combust in the diesel oxidation catalyst so as to target a first increase, $\Delta T_1$, in exhaust gas temperature in the diesel oxidation catalyst; and (ii) removing the first limit on engine speed and targeting an engine speed set point, wherein the engine speed set point is at a higher speed than the first limit on engine speed.

Advantageously, therefore, the temperature of exhaust gas is increased by both: (a) increased combustion in the engine on account of the second engine speed limit being higher than the first; and (b) combustion of post-injection fuel in the DOC module.

In a specific arrangement, the method further comprises an escalation architecture wherein increasing restrictions are placed on useful work output of the internal combustion engine as the numerical indication of efficiency reduces.

Advantageously, therefore, the method of the present disclosure provides an escalating aftertreatment cleaning strategy that presents the user with increasing restrictions on the useful work achievable with the engine until aftertreatment efficiency is regained by implementation of an appropriate aftertreatment cleaning process within that strategy.

BRIEF DESCRIPTION OF THE DRAWINGS

Embodiments of the disclosure are now described with reference to the accompanying drawings, in which.

DETAILED DESCRIPTION

Figure 1:
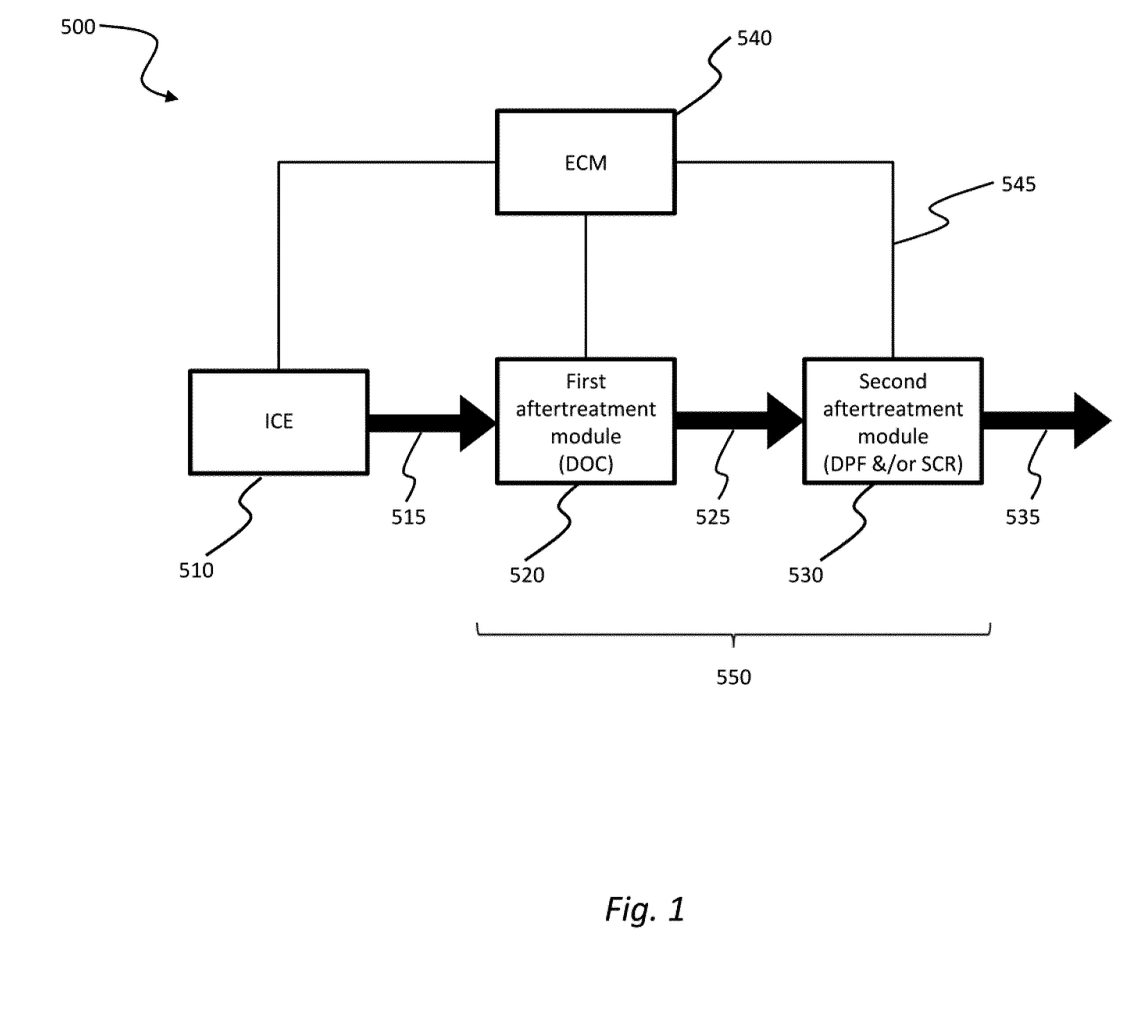
FIG. 1 shows a highly schematic representation of an engine assembly to which the method of the disclosure may be applied.

For understanding the context of the method of the disclosure, there follows a description of a possible exhaust gas treatment apparatus 550 of an engine assembly 500 that may be controlled by the method. As the skilled person would readily understand, the method of the disclosure is applicable to a wide range of exhaust gas treatment apparatus and is not limited to the specific example described below, which is provided simply for assisting the reader in understanding the context of the method of the disclosure.

The exhaust gas treatment apparatus 550 of FIG. 1 comprises a fluid flow path 515, 520, 525, 530, 535 through which fluid may flow sequentially through various modules 520, 530 for treatment of exhaust gas prior to release to atmosphere.

The fluid flow path downstream of the engine 510 may comprise, in series, a first conduit 515 linking an outlet of the engine 510 with an inlet of a first aftertreatment module 520 comprising a DOC module, a second conduit 525 linking an outlet of the first aftertreatment module 520 with an inlet of the second aftertreatment module 530, and a third conduit 535 providing an exit from the second aftertreatment module 530 to atmosphere. The second aftertreatment module may comprise a DPF module and/or an SCR module. Where the second aftertreatment module comprises both a DPF module and an SCR module, the SCR module may be downstream of the DPF module. Further modules (not shown) may be present, downstream or upstream of the other modules. Such additional modules, where present, may include a separate DPF module or a separate SCR module.

The engine 510 may comprise a combustion unit (not shown) having an exhaust conduit 515 and one or more combustion cylinders (not shown). Each of the one or more cylinders may comprise a piston, a fuel injector, an intake valve and an exhaust valve leading to the exhaust conduit. Fuel may be injected into the (or each) combustion cylinder via the fuel injector. The fuel injector may be configured to inject fuel in accordance with a controlled timing pattern.

In order to increase a temperature of exhaust gas in the exhaust gas treatment apparatus, for example as part of an aftertreatment cleaning process, it is known to burn fuel in the DOC module 520 for the purpose of increasing exhaust gas temperature. While it is possible to inject fuel for this purpose directly into the DOC module 520, it is also possible to avoid the need for a separate injector by employing the fuel injector already present in the combustion cylinder(s) of the engine 510. This may involve injection of fuel for combustion in the DOC module 510 by injecting it into the combustion cylinder(s) of the engine at a time in the combustion cycle (e.g. during an exhaust stroke of the cylinder) when conditions are such that the fuel will pass directly through the cylinder without burning and therefore be available for combustion within the DOC module 510. Such injections may be termed subsidiary injections or post combustion injections so as to distinguish them from main injections that are timed so as to combust in the cylinder and so drive the piston in a conventional manner.

A process intended to result in improved efficiency of the exhaust gas treatment apparatus (e.g. by removal of soot deposits from the DPF module) may be described as an aftertreatment system cleaning process or regeneration process.

An extent to which aftertreatment cleaning is required may depend upon an extent to which aftertreatment efficiency has been reduced.

In the case of a DPF module, an extent to which DPF cleaning is required may depend upon an amount of soot that is sensed or inferred as being present in the DPF. The amount of soot sensed or inferred may be described as a soot load. Modest soot load may prompt a different cleaning strategy from that required if the soot load is more significant. It is known to provide different DPF cleaning processes responsive to the soot load. Furthermore, it is known to escalate a series of increasingly efficacious DPF cleaning processes in response to an increasing soot load.

In the case of an SCR module, an extent to which SCR cleaning is required may depend upon an extent to which deposits have accumulated within the SCR module. Rather than sensing deposits, it may simply be assumed that following a predefined period since a previous cleaning event deposits are likely to have accumulated and so the timing of cleaning the SCR may simply be based on a predefined time interval since a previous cleaning event.

Figure 2:
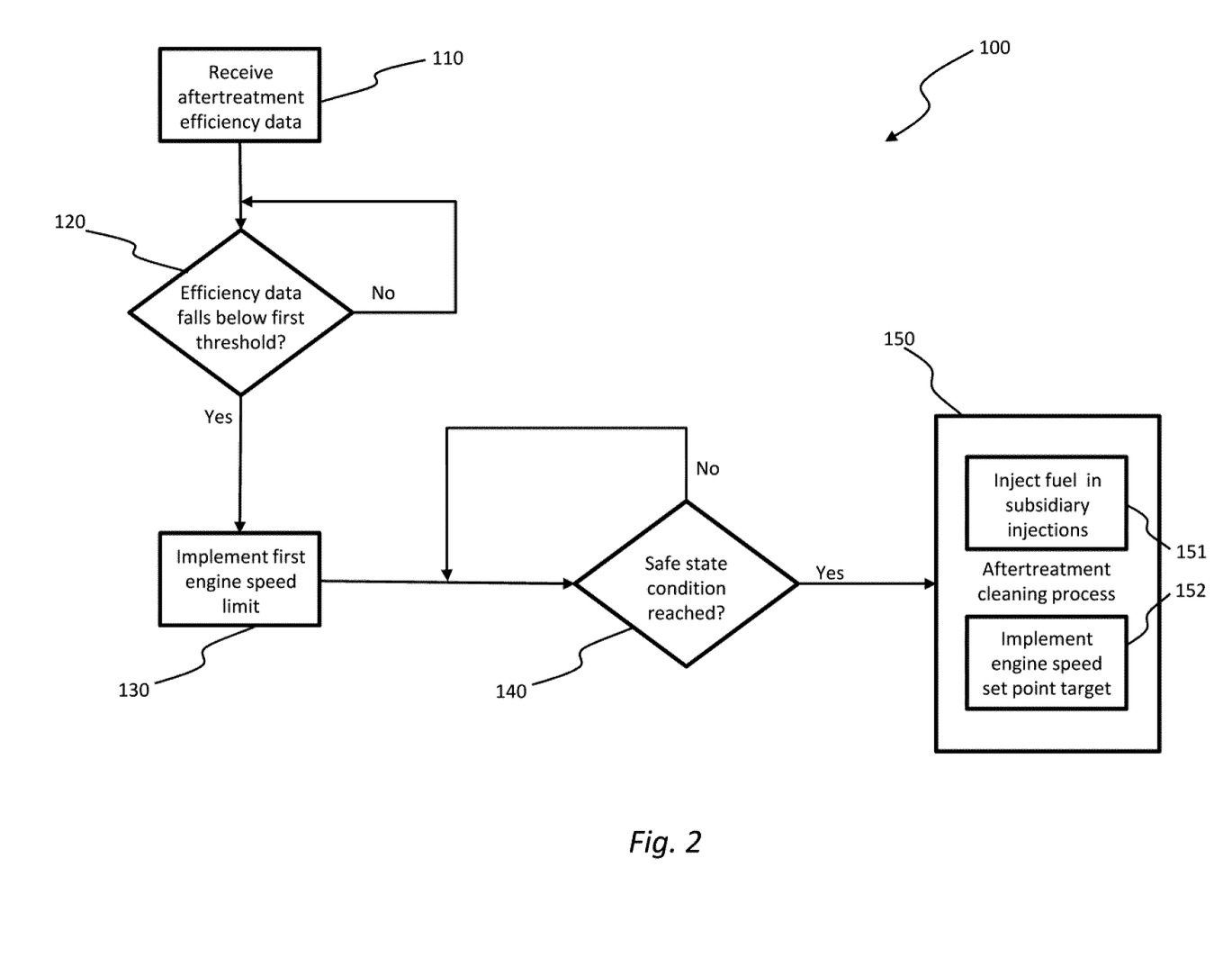
FIG. 2 shows a flow chart of a first embodiment of a method of controlling an engine assembly in accordance with the disclosure.

An embodiment of a method 100 of controlling an engine assembly in accordance with the disclosure is shown in FIG. 2. This method involves invoking a major cleaning strategy, whereby the major cleaning strategy effectively prevents an operator from using the engine to perform useful work.

The method involves, at step 110, receiving aftertreatment efficiency data (which may be sensed or inferred) and determining, at step 120, whether a reduction in aftertreatment efficiency (caused, for example, by an accumulation of soot deposits) is such that aftertreatment efficiency drops below a threshold. The threshold may represent an absolute efficiency level or percentage efficiency, or some other variable that is a function of efficiency. In other words, it is determined whether a shortfall in efficiency is sufficiently large such that the efficiency drops below the threshold level. The efficiency, whether measured or inferred, may be expressed numerically.

In the event that the numerical indication of the efficiency is determined to fall below the first threshold value, the method involves implementing a first engine speed limit, at step 130.

The first engine speed limit may be intended to limit the amount of useful work that the engine 110 is capable of performing. This may provide a highly noticeable signal to an operator of the engine assembly 100 that an aftertreatment cleaning process that is incompatible with normal engine operation is required, without immediately forcing the operator to cease all useful work.

It may be intended, as a consequence of this first speed limit being introduced, that the operator will reach an appropriate opportunity to cease useful work altogether and park the machine (without switching off the engine).

A condition of proceeding with the method may involve determining if a "safe state" condition has been reached. The safe state condition may comprise or include determining that that useful work has ceased (e.g. the engine is to idling) without switching off the machine.

The method may further comprise determining if the safe state condition has been reached, at step 140. Where the safe state condition has been reached, the method may then involve invoking a dedicated DPF cleaning process, at step 150.

The dedicated aftertreatment cleaning process may be termed dedicated since it may take place during a dedicated cleaning phase rather than in tandem with the engine performing other useful work. During this phase, a control strategy for the engine may be predominantly or exclusively targeting aftertreatment cleaning.

The dedicated aftertreatment cleaning process may comprise two or more elements.

One element may involve targeting an engine speed set point 152 that may be higher than the first engine speed limit (such that more combustion may occur in the engine 510 when operating at the engine speed set point than when operating under the first engine speed limit) so as to increase in cylinder combustion and so increase a temperature of exhaust gas exiting the engine 510 and arriving at the aftertreatment apparatus 550.

Another element may be injecting fuel in subsidiary injections 151 such that the fuel does not combust in the cylinder(s) of the engine 510 but instead arrives at the DOC module 520 where it combusts, thereby increasing the temperature of exhaust gas in the DOC module 520 further. These subsidiary injections may be configured to target an increase in temperature of $\Delta T_1$.

In summary, increased engine speed may result in an increase in the temperature of exhaust gas exiting the engine and entering the aftertreatment apparatus while the subsidiary injections may combust in the DOC module 520 thereby resulting in increased temperature of the exhaust gas within the DOC module 520 which is upstream of the second aftertreatment module.

The step of injecting fuel in subsidiary injections 151 may begin before, after or simultaneously with the step of targeting the engine speed set point 152.

It may be that the nature (such as the timing and volume) of the post combustion fuel injections is what renders the dedicated aftertreatment cleaning process incompatible with regular engine work.

The combination of increased exhaust temperature entering the aftertreatment apparatus together with combustion in the DOC module of fuel injected into the engine in post combustion events results in a significant increase of temperature within the second aftertreatment module. This increased temperature may result in combustion of accumulated soot in the DPF, where present, meaning that the soot load decreases and/or may result in combustion of ammonia deposits in the SCR, where present.

Figure 3:
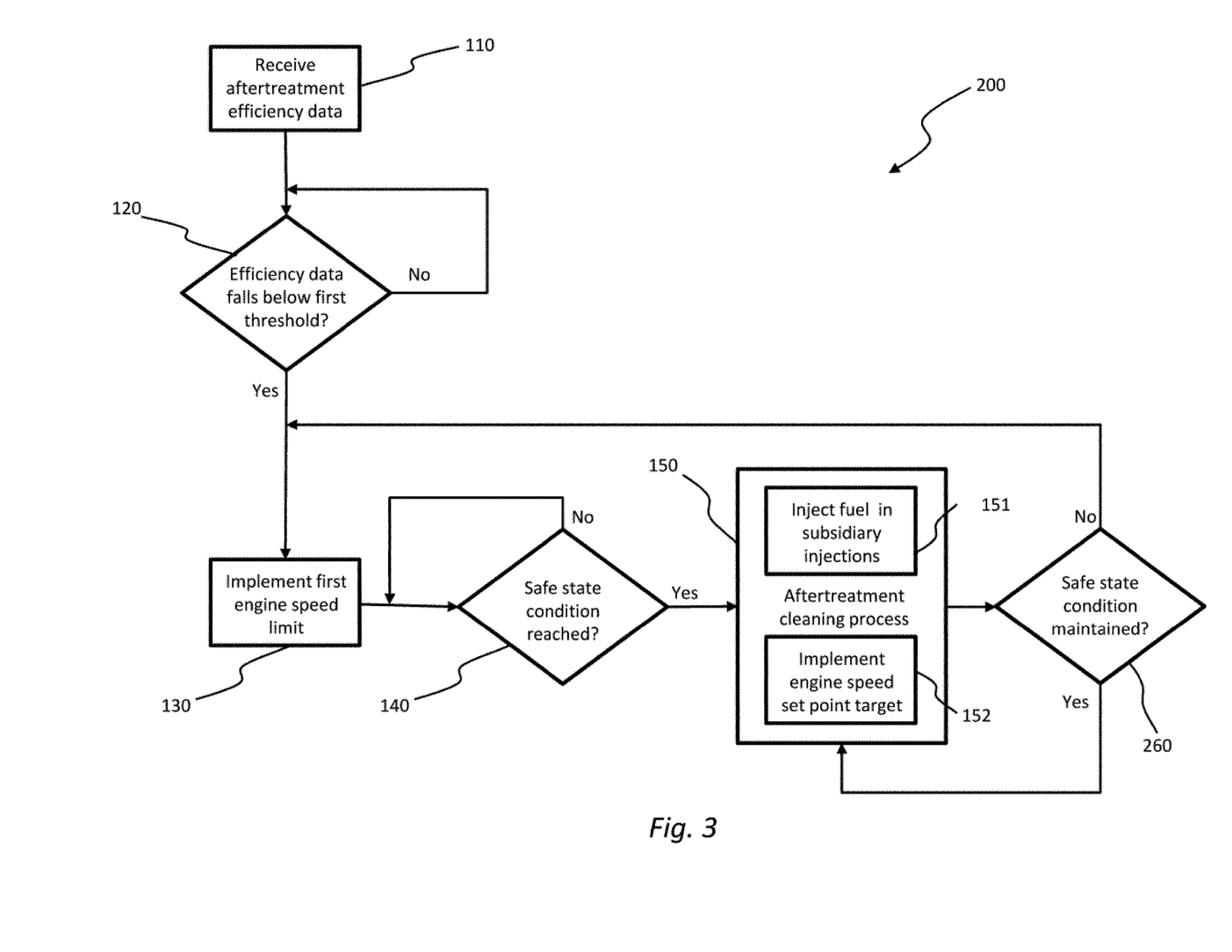
FIG. 3 shows a flow chart of a second embodiment of a method of controlling an engine assembly in accordance with the disclosure.

An alternative embodiment of the method is shown in FIG. 3. This embodiment is similar to that shown in FIG. 2 and provides additional functionality. The additional functionality involves, at step 260, interrupting the aftertreatment cleaning process in the event that the safe state condition ceases. The safe state condition may cease, for example, in the event that a user attempts to control the machine, such as to do useful work. Furthermore, the interruption of the aftertreatment cleaning process may be followed by reimposition of the first engine speed limit, at step 130, and a repeat of the process of the first embodiment whereby, only on return to safe state conditions, may the aftertreatment cleaning process recommence.

Figure 4:
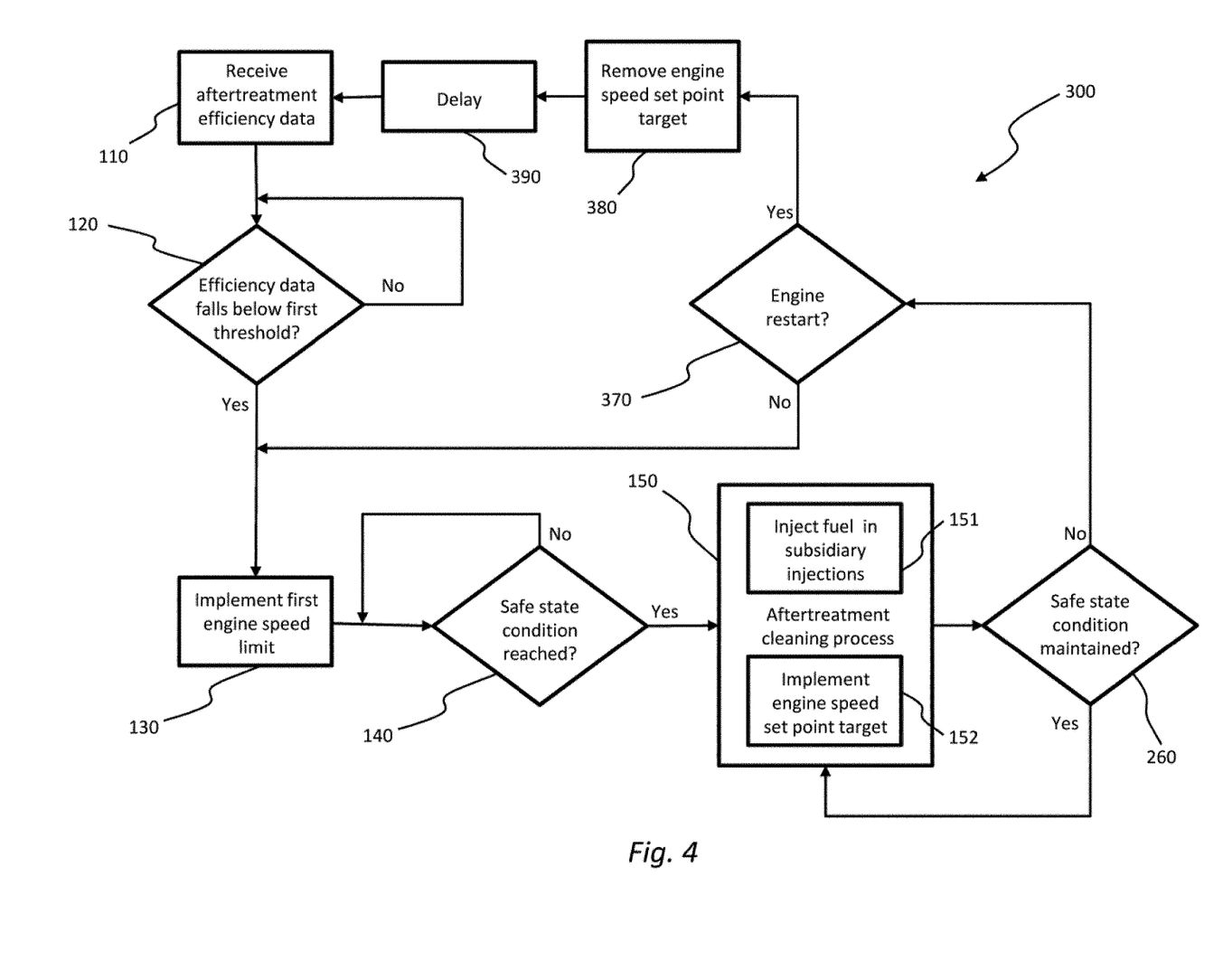
FIG. 4 shows flow chart of a third embodiment of a method of controlling an engine assembly in accordance with the disclosure.

A further alternative embodiment of the method is shown in FIG. 4. This embodiment is similar to that shown in FIG. 3 and provides still further functionality.

This embodiment recognises that there may be circumstances in which useful work is considered by the operator to be absolutely necessary. For example, it may be considered absolutely necessary to move the machine comprising the engine out of a hazardous situation (such as away from other machines). The embodiment of FIG. 4 shows a method that allows for such an opportunity for the operator.

In the FIG. 4 embodiment, the method allows for the possibility, at step 370, of a user initiating an exit of the aftertreatment cleaning process and returning to normal engine operation by restarting the engine. This results in at least a partial interruption of the method and initiates a limited-time delay before recommencing the method. When the delay ends, the method may be resumed at an appropriate point in the method loop, such as the step of receiving aftertreatment efficiency data (step 110) as shown in FIG. 4 or, alternatively (not shown in FIG. 4), at the step of implementing the first engine speed limit, at step 130.

It may be that the condition of restarting the engine is limited to a quick restart. A quick restart may be one where the engine is switched off and restarted within a limited period of, say, 5 seconds or 10 seconds. In this way, the possibility of initiating an exit of the aftertreatment cleaning process is not merely available by leaving the machine unused for a longer period and then restarting it.

In a further variation of the FIG. 4 embodiment (not illustrated) it may be that initiation of the exit from the aftertreatment cleaning process and returning to normal engine operation by restarting the engine is available as an option only a limited number of occasions, such as once, twice, three times, or more than three times. In this way, an operator has a limited number of opportunities to regain normal operator control before effectively the operator can no longer avoid the aftertreatment cleaning process.

It may be that the embodiments described above and illustrated in FIGS. 2, 3 and 4 are part of an escalating strategy for increasing the likelihood of an aftertreatment cleaning process taking place whilst, at each stage, reducing the opportunity for an operator to control the engine for the purpose of performing regular engine working tasks.

The embodiments of FIGS. 2, 3 and 4 all have the potential to result in major aftertreatment cleaning strategies whereby use of the engine to perform useful work is effectively prevented. The embodiments of FIGS. 2, 3 and 4 may form part of a wider set of strategies that include minor cleaning processes—whereby user control of the engine is not interrupted—that occur before a major cleaning process is implemented.

In accordance with one specific embodiment, it may be that a first level strategy may simply involve minor thermal management and occasional post combustion fuel injection to provide modest interventions for thermal management which are not apparent to the user. Such post combustion fuel injections may be configured to target a temperature increase of $\Delta T_2$.

In a second level strategy, it may be that larger quantities of post combustion injections take place which result in slightly less modest effects which may be mildly apparent to a user without preventing a user from using the engine to perform useful work.

In a third level strategy, it may be that an operator is provided with a visible alert that a dedicated aftertreatment cleaning process is necessary. This is intended to alert a user to find an opportunity (but does not coerce the user) to stop normal work in order to allow a major aftertreatment cleaning process to take place, perhaps by manually initiating that aftertreatment cleaning sequence.

A fourth level strategy may be the same as the third level strategy except that the visible alert of the third level strategy may be substituted for an audible alert in the fourth level strategy.

It may then be that a fifth level strategy is to initiate the method of the embodiments of FIG. 2, 3 or 4.

Figure 5:
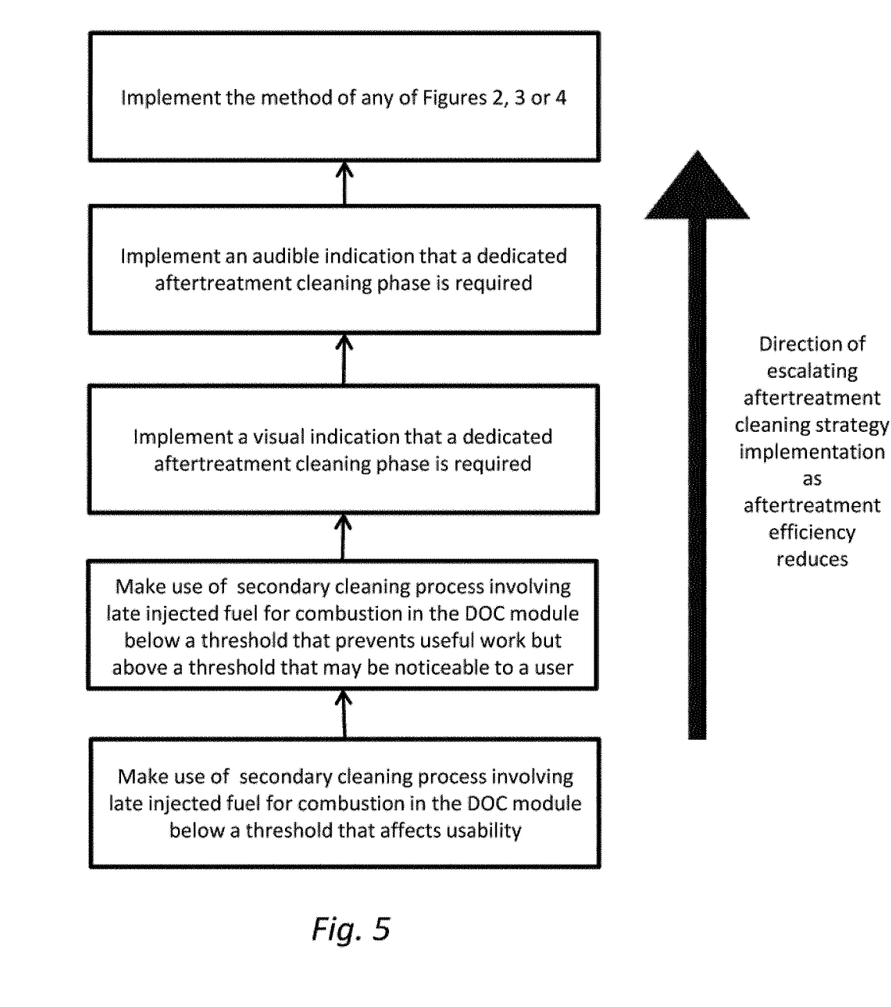
FIG. 5 shows a representation of a first embodiment of an escalation strategy for an aftertreatment system cleaning process in accordance with the disclosure.
Figure 6:
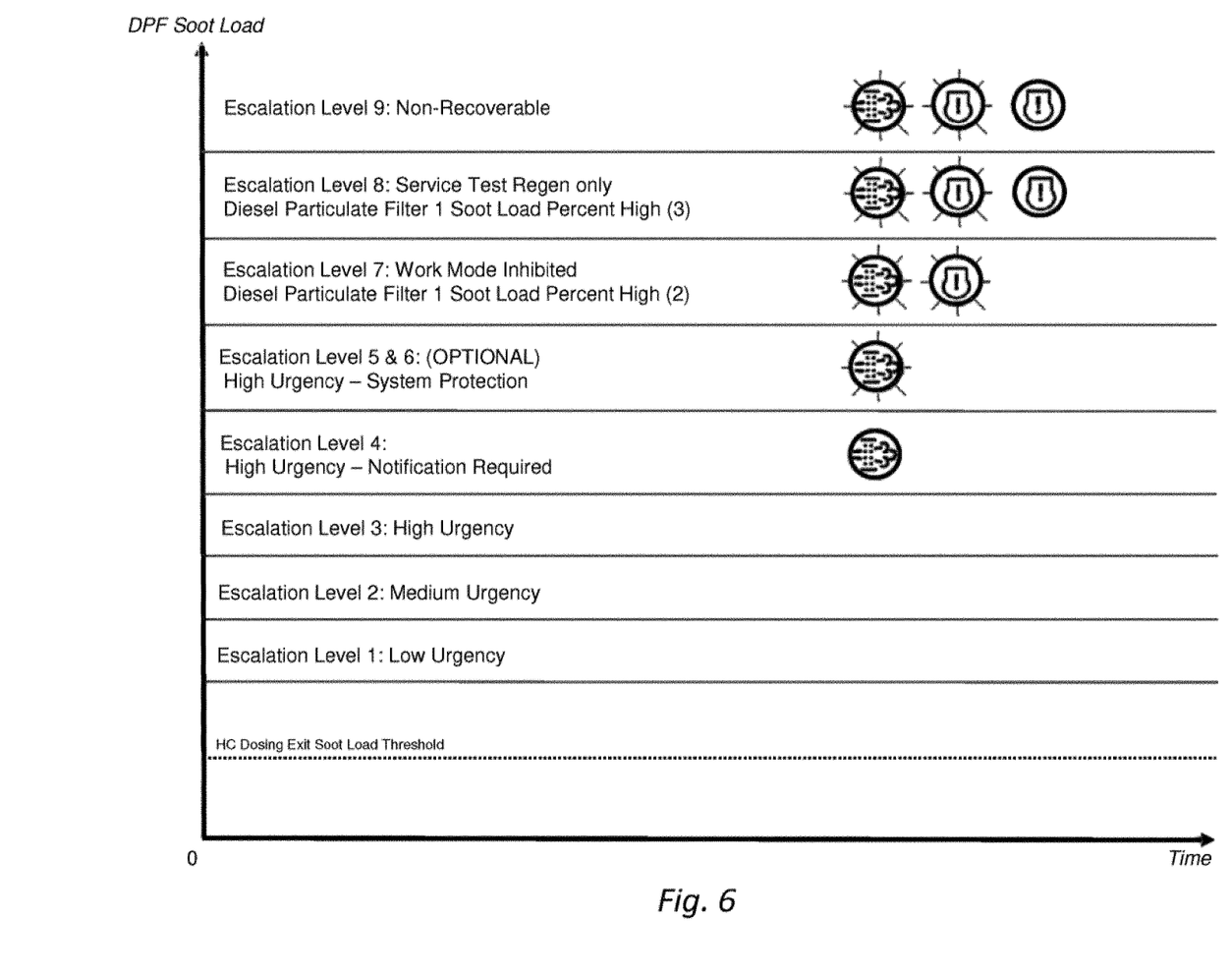
FIG. 6 shows a representation of a second embodiment of an escalation strategy for an aftertreatment system cleaning process in accordance with the disclosure.

FIG. 6 shows an embodiment of an escalating strategy with even more escalation levels than the FIG. 5 embodiment.

The over-arching strategy may be to seek to manage aftertreatment efficiency actively through engine use and, when a reduction in aftertreatment efficiency reaches a threshold sufficient to warrant more significant aftertreatment cleaning, to encourage an operator to cease seeking to perform useful work and instead allow a dedicated aftertreatment cleaning process to take place. The over-arching strategy may then, in the event that a user fails to allow a major aftertreatment cleaning process to begin, introduce increasingly severe steps to persuade the user to allow that major aftertreatment cleaning process to take place. Severe steps may mean steps that are likely to have an increasing likelihood of persuading the user to take action for example, by providing visible then audible warnings, followed by restricting the ability of a user to control the engine in such a way as to perform useful work.

INDUSTRIAL APPLICABILITY

The strategies set out in the present disclosure may be particularly appropriate for engines that do not have a back pressure valve. Where present, a backpressure valve is often used in the aftertreatment thermal management to control pressure for the purposes of increasing temperature. For engines where there is no backpressure valve, and so techniques involving that valve are unavailable, the techniques as set out herein may be particularly applicable.

In engines without a backpressure valve, it may be that the intake throttle valve is controlled as part of the process described herein for limiting engine speed appropriately.

That said, the strategies set out herein may be applicable to any internal combustion engine having an aftertreatment apparatus whose efficiency may be improved by appropriate thermal management.

The invention claimed is:

1. A method of controlling an engine assembly comprising an internal combustion engine and an exhaust gas treatment apparatus,
   the exhaust gas treatment apparatus comprising a first aftertreatment module comprising a diesel oxidation catalyst and a second aftertreatment module downstream of the first aftertreatment module;
   the engine assembly configured to provide a numerical indication of an efficiency of the second aftertreatment module;
   the method comprising:
   comparing the numerical indication of efficiency with a first threshold value and, where the numerical indication of efficiency is such that efficiency falls below the first threshold value, performing the following steps in order:
   (a) implementing a first limit on engine speed;
   (b) awaiting an engine safe state condition;
   (c) implementing a primary cleaning process of the second aftertreatment module, the primary cleaning process comprising, in either order or simultaneously:
      (i) injecting fuel into the engine after an engine combustion event such that the fuel passes through the engine without combusting for the fuel to combust in the diesel oxidation catalyst so as to target a first increase, $\Delta T1$, in exhaust gas temperature in the diesel oxidation catalyst; and
      (ii) removing the first limit on engine speed and targeting an engine speed set point, wherein the engine speed set point is at a higher speed than the first limit on engine speed,
   wherein in an event that the engine is restarted the method comprises removing the targeting of the engine speed set point for a predetermined delay period before resuming the method.

2. The method of claim 1 wherein in an event that the engine safe state condition is interrupted during the step of implementing the primary cleaning process of the second aftertreatment apparatus, the method returns to the step of implementing the first limit on engine speed.

3. The method of claim 1 wherein the step of restarting the engine to remove the targeting of the engine speed set point for a predetermined delay period is available for only a predetermined finite number of engine restarts.

4. The method of claim 1 wherein the first limit on engine speed is equivalent to a regular idle speed of the engine.

5. The method of claim 1 wherein the set point target engine speed is equivalent to an enhanced idle speed of the engine.

6. The method of claim 1 wherein the method further comprises the following steps that precede the method steps of claim 1:
   comparing the numerical indication of efficiency with a second threshold value, wherein the second threshold value represents a higher efficiency than the first threshold value and, where the numerical indication of efficiency falls between the first and second threshold values:
    implementing a secondary cleaning process of the second aftertreatment module, the secondary cleaning process comprising injecting fuel into the engine after an engine combustion event such that the fuel passes through the engine without combusting for the fuel to combust in the diesel oxidation catalyst so as to target a second increase, $\Delta T2$, in exhaust gas temperature in the diesel oxidation catalyst, wherein $\Delta T2 < \Delta T1$.

7. The method of claim 6 wherein, where the numerical indication of efficiency falls between the first and second threshold values, the method comprises imposing no specific limit on engine speed.

8. The method of claim 6 wherein, where the numerical indication of efficiency falls between the first and second threshold values, the method comprises imposing a second limit on engine speed representing a higher speed than the first limit on engine speed.

9. The method of claim 1 wherein the method further comprises the following steps that precede the method steps of claim 1:
    comparing the numerical indication of efficiency with a third threshold value and, where the numerical indication of efficiency falls below the third threshold efficiency value:
    providing a warning lamp to advise an operator that the primary cleaning process is required;
    wherein the third threshold value represents a higher efficiency that the first threshold value.

10. The method of claim 1 wherein the method further comprises the following steps that precede the method steps of claim 1:
    comparing the numerical indication of efficiency with a fourth threshold value and, where the numerical indication of efficiency falls below the fourth threshold efficiency value:
    providing an audible alarm to advise an operator that the primary cleaning process is required;
    wherein the fourth threshold value represents a higher efficiency that a third threshold value.

11. The method of claim 1 further comprising comparing the numerical indication of efficiency with a critical threshold value and, where the numerical indication of efficiency falls below the critical threshold value, the method comprises preventing use of the internal combustion engine altogether.

12. The method of claim 1 wherein the second aftertreatment module comprises a diesel particulate filter module and the numerical indication of efficiency comprises a function of a DPF soot load.

13. The method of claim 1 wherein the second aftertreatment module comprises a selective catalytic reduction module and the numerical indication of efficiency comprises a function of SCR backpressure.

14. An internal combustion engine assembly comprising an internal combustion engine and an exhaust gas treatment apparatus,
    the exhaust gas treatment apparatus comprising a first aftertreatment module comprising a diesel oxidation catalyst and a second aftertreatment module downstream of the first aftertreatment module;
    the engine assembly configured to provide a numerical indication of an efficiency of the second aftertreatment module;
    the internal combustion engine assembly further comprising an engine control module configured to:
    compare the numerical indication of efficiency with a first threshold value and, where the numerical indication of efficiency is such that efficiency falls below the first threshold value, to perform the following steps in order:
        (a) implementing a first limit on engine speed;
        (b) awaiting an engine safe state condition;
        (c) implementing a primary cleaning process of the second aftertreatment module, the primary cleaning process comprising, in either order or simultaneously:
            (i) injecting fuel into the engine after an engine combustion event such that the fuel passes through the engine without combusting for the fuel to combust in the diesel oxidation catalyst so as to target a first increase, $\Delta T1$, in exhaust gas temperature in the diesel oxidation catalyst; and
            (ii) removing the first limit on engine speed and targeting an engine speed set point, wherein the engine speed set point is at a higher speed than the first limit on engine speed,
    wherein in an event that the engine is restarted the engine control module is configured to remove the targeting of the engine speed set point for a predetermined delay period before resuming preforming the steps.

15. The internal combustion engine assembly of claim 14 wherein the engine control module is configured to make available restarting the engine to remove the targeting of the engine speed set point for a predetermined delay period for only a predetermined finite number of engine restarts.

* * * * *